United States Patent Office 3,398,835
Patented Aug. 27, 1968

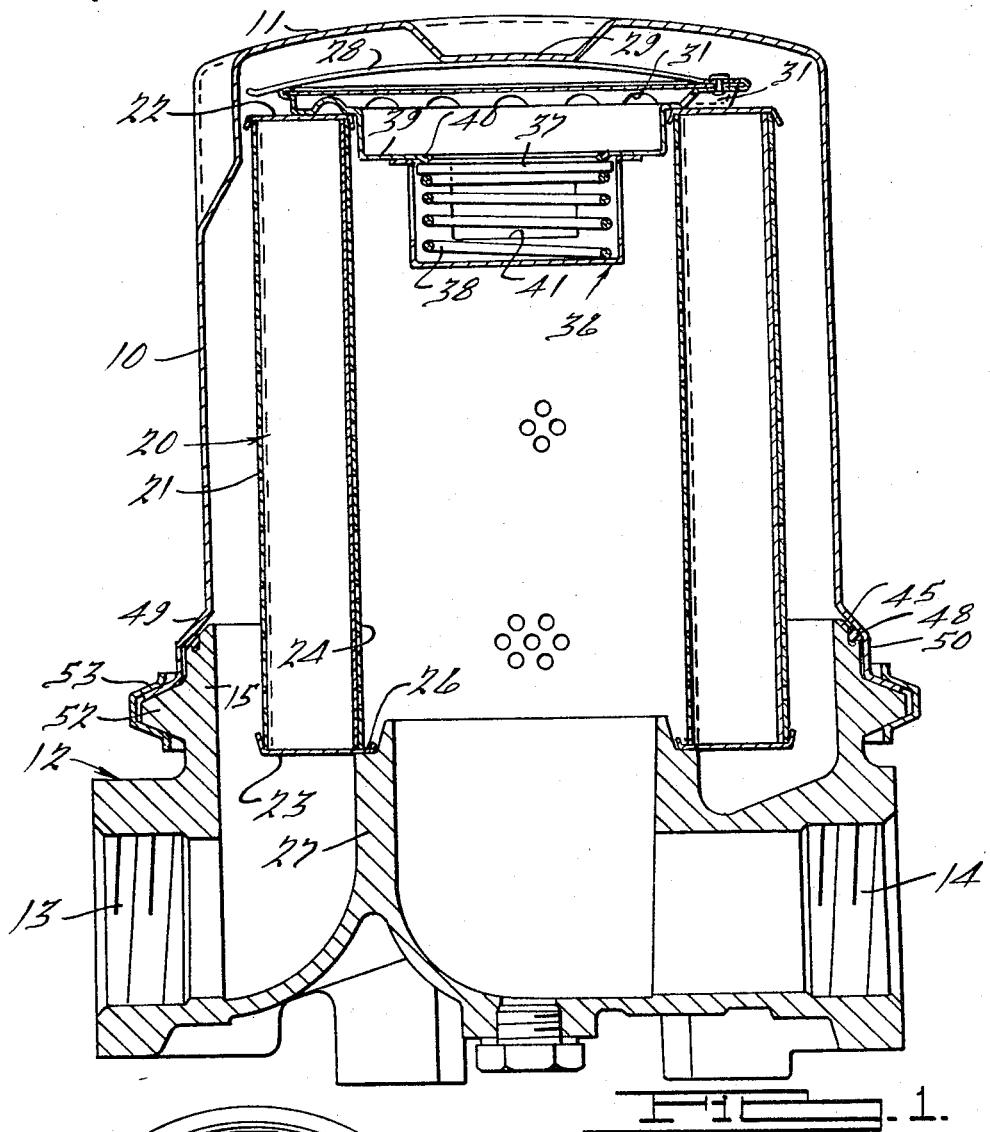
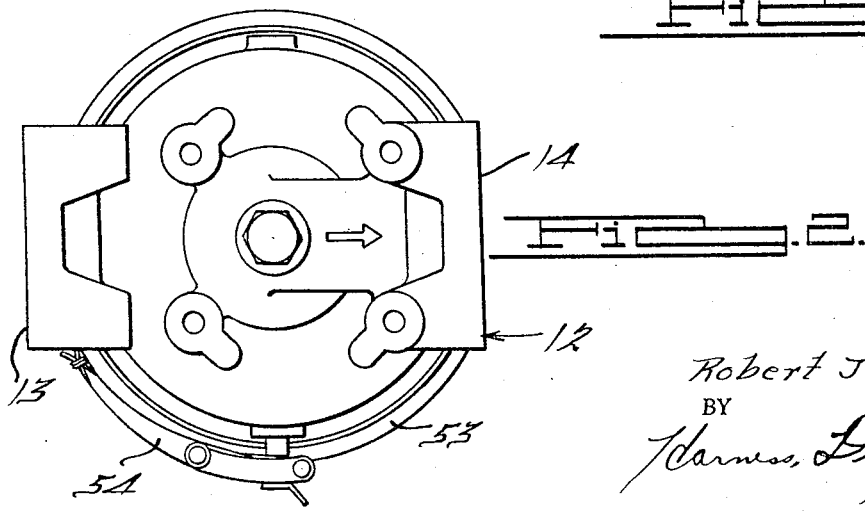

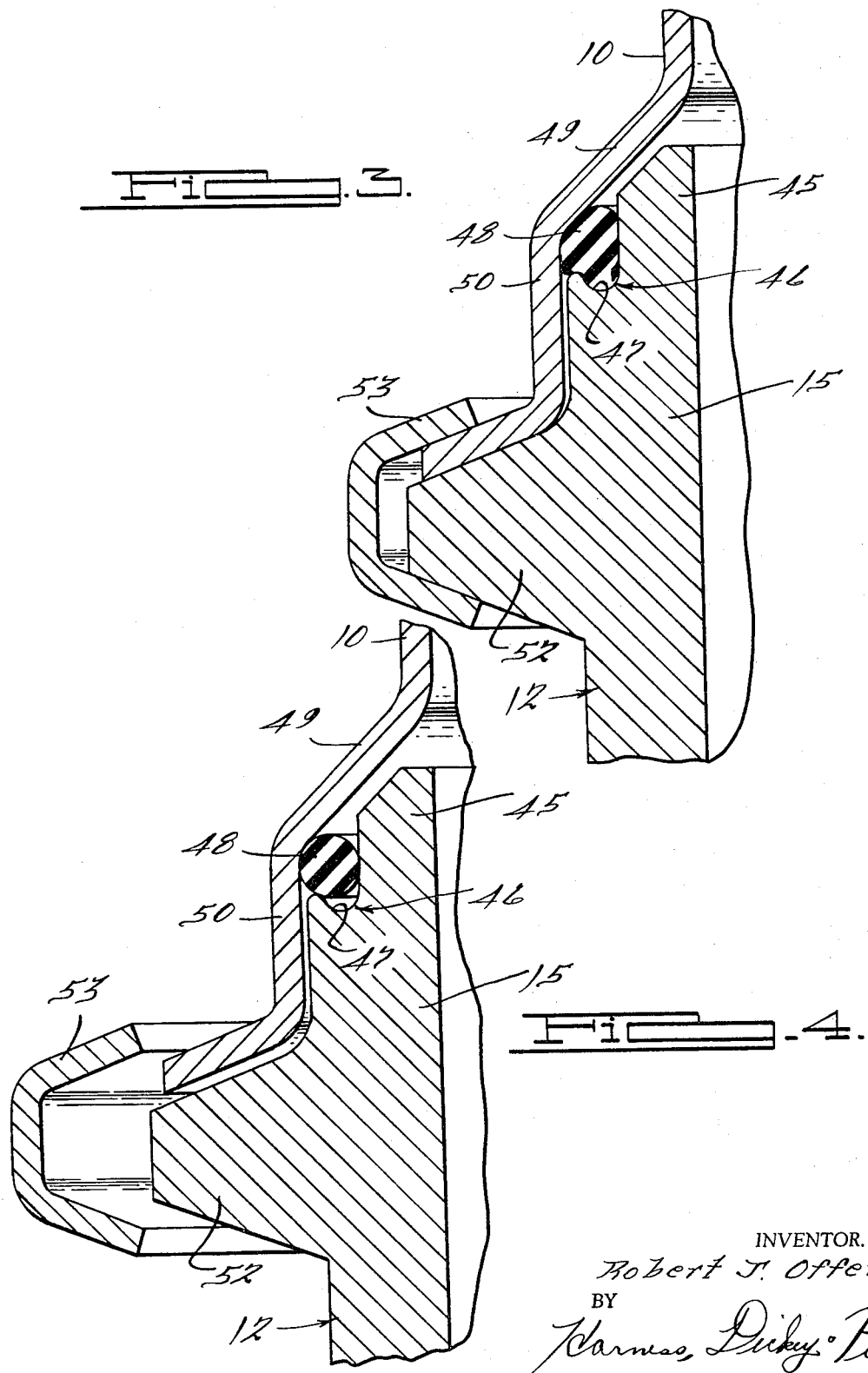

3,398,835
FILTER
Robert J. Offer, Racine, Wis., assignor to Walker Manufacturing Company, Racine, Wis., a corporation of Delaware
Filed Sept. 22, 1965, Ser. No. 489,210
1 Claim. (Cl. 210—443)

ABSTRACT OF THE DISCLOSURE

A filter assembly of housing, filter element, and base includes aligned conical and cylindrical portions on the housing and base and a radial shoulder with an annular groove along with an O-ring seal that is larger than the groove that is trapped by the conical and cylindrical surfaces to form an effective seal compressed by axial motion of the housing when it is clamped to the base.

---

This invention relates to fluid filters and the like and, more particularly, to the seal between the filter shell and the base of the filter.

Heretofore, in filter constructions of this type the seal between the filter body and the filter base comprised a groove in the base to retain the sealing member which was an O-ring or the like. In many designs, it was difficult, expensive or practically impossible to cast a groove in the base, thereby requiring a machining operation to produce the groove. The present invention eliminates the necessity of forming a groove in the base and thus contributes to economy of fabrication. The principal difference between the present invention and the prior practice is that the vertical entrapment of the O-ring or other type seal is accomplished between the base and the filter shell rather than between the top and bottom surfaces of a groove in the base.

It is therefore an object of this invention to simplify the means for providing a seal between the base of the filter and the filter shell. This is accomplished by forming the base at one end thereof, during casting, with a reduced portion providing an annular shoulder on which the O-ring is located and shaping the shell of the filter to provide an annular portion engaging the O-ring to seal the joint between the base and shell.

The various objects and advantages, and the novel details of construction of one commercially practical embodiment of the invention, will become more apparent as this description proceeds, especially when considered in connection with the accompanying drawings, in which:

FIGURE 1 is a longitudinal sectional view of a filter embodying this invention;

FIGURE 2 is a bottom plan view of the filter;

FIGURE 3 is an enlarged fragmentary view showing in detail the seal between the base of the filter and the filter shell; and FIGURE 4 is an enlarged detail view of the seal prior to the final tightening of the clamp.

By referring to FIGURE 1, one environment, such as an oil filter, will be described with respect to which the seal between the filter shell and the base of the filter constituting this invention may be used to particular advantage.

In FIGURE 1, the reference character 10 indicates a shell or casing, usually cylindrical, which has a closed top 11 and a cast metal base 12 closing the bottom of the shell 10. The cast metal base 12 is provided with an inlet 13 and an outlet 14 by means of which the filter may be connected to an oil inlet or an oil outlet, respectively.

The base 12 is provided with an annular flange 15 to which the shell 10 is adapted to be sealingly connected in a manner and by means constituting this invention and yet to be described.

Arranged within the housing or shell 10 is a filter element 20 contained within a perforated filter element shell 21, the upper and lower ends of which are closed by end or cap plates 22 and 23. Arranged centrally of the filter element is a perforated center tube 24. In the embodiment of the invention illustrated herein, the lower end of the filter rests upon a ledge 26 formed on an annular wall 27 which forms a passageway connected with the outlet 14.

The filter element is held in place by a holddown spring 28 engaging an inwardly extending depression 29 formed on the top 11.

The holddown spring 28 is carried by a valve member, indicated generally by the reference character 30. This valve member rests upon the top of the filter element and is provided with peripheral openings 31 to permit the flow of fluid therethrough. The reference character 36 indicates a bypass valve housing containing a bypass valve 37 which is normally urged into closed position by a spring 38. The valve housing 36 is shown as attached to the wall 39 of a dish-shaped recess which is formed with an annular rib 40 to provide a seat for the valve 37. The housing 36 is provided with one or more openings 41 to permit the escape of fluid when the relief valve 37 is opened. The pressure relief valve operates when the filter element becomes clogged or the oil is particularly viscous. Under such conditions, the oil may bypass the filter element by flowing through the openings 31 and flowing out the openings 41.

Any other known type of bypass arrangement may be employed with equal facility, as this portion of the construction forms no part of the present invention.

The present invention consists principally in the means for sealing the shell 10 to the base 12.

The annular flange 15 is provided with a reduced end portion 45 providing an annular shoulder 46. The annular shoulder 46 is provided with a groove 47, see particularly FIGURE 4, into which a sealing element in the form of an O-ring 48 is adapted to be deformed. The shell 10 is formed with an annular inclined portion 49 and a vertical portion 50. As shown in FIGURE 4, the O-ring 48 engages the wall portions 49 and 50 at their juncture. This distorts or deforms the O-ring 48 into the groove 47 and causes the same to tightly engage the shoulder 46 and the adjacent wall of the reduced portion 45, as clearly shown in FIGURE 3.

It will be noted that in FIGURE 4, the clamping ring 52 has not been completely tightened; whereas, in FIGURE 3, the clamping ring has been completely tightened and the O-ring 48 has been deformed as just described.

The terminal end 51 of the shell engages a tapered rib 52 on the annular flange 15 of the base 12. A channel-shaped clamping ring 53 having fastening and tightening means 54 (see FIGURE 2) is employed for securing the shell 10 to the tapered rib 52 on the annular flange 15.

From the foregoing, it will be noted that there is provided a construction which does not require a groove to retain the O-ring and therefore does not necessitate a machining operation. The reduced portion providing an annular shoulder on which the O-ring is located may be formed during the casting of the base of the filter and the inclined portion on the shell may be easily formed when the shell portion is shaped. Thus, the present invention contributes to the economy of fabrication of the device.

While one commercially practical embodiment of the invention has been described and illustrated herein somewhat in detail, it will be understood that various changes may be made as may come within the purview of the accompanying claim.

What is claimed is:

1. A filter assembly comprising a base having an annular seating surface and an annular wall spaced radially outwardly from the seating surface, a filter element seated on the seating surface, a cup-shaped tubular housing enclosing the filter element and having an end portion surrounding said annular wall, said wall having an end portion which is conical on the outside of the wall and a first cylindrical portion on the outside of the wall adjacent to said conical end portion, said wall having a second outside cylindrical portion larger in diameter than the first and a radially extending shoulder joining the two cylindrical portions, said wall having a radial flange on the outside thereof including a second conical portion on the outside of the wall adjacent to and extending radially out from the second cylindrical portion, said radial shoulder having an annular groove of curved cross section facing toward the conical end portion of the wall, said housing end portion having a conical end flange adapted to seat upon said second conical wall portion and be clamped to said flange, said housing having a cylindrical portion adjacent to its conical portion and in radial alignment with the second cylindrical portion of said wall when the housing is clamped to said flange, said housing having a second conical portion adjacent to its cylindrical portion and in radial alignment with the conical end portion of the wall and with part of the first cylindrical portion of the wall and joining the cylindrical portion of the housing in a corner located intermediate the ends of the first cylindrical portion of the wall, and an O-ring seal larger in diameter than said groove and seated on said radial shoulder and positioned in said corner of the housing, said O-ring being compressed against the cylindrical portion and the conical portion of said housing on opposite sides of said corner and against the first cylindrical portion of the wall and the radial shoulder and groove of the wall when the housing is clamped to the flange.

References Cited
UNITED STATES PATENTS

| | | | |
|---|---|---|---|
| 2,389,431 | 11/1945 | Hallinan | 210—443 X |
| 2,537,249 | 1/1951 | Walton. | |
| 2,657,806 | 11/1953 | Launder | 210—443 |
| 3,262,563 | 7/1966 | Pall | 210—443 X |

SAMIH N. ZAHARNA, *Primary Examiner.*

FRANK W. MEDLEY, *Assistant Examiner.*